(12) United States Patent
Xie et al.

(10) Patent No.: US 12,018,173 B1
(45) Date of Patent: Jun. 25, 2024

(54) HIGH PHYSICAL DURABILITY COATING COMPOSITIONS

(71) Applicant: SWIMC LLC, Cleveland, OH (US)

(72) Inventors: Zhiwei Xie, Calabasas, CA (US);
James M. Cameron, Cleveland, OH (US); Ruisong Xu, Cleveland, OH (US); Jose Aravena Contreras, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 666 days.

(21) Appl. No.: 16/947,859

(22) Filed: Aug. 20, 2020

Related U.S. Application Data

(60) Provisional application No. 62/889,681, filed on Aug. 21, 2019.

(51) Int. Cl.
| | | |
|---|---|---|
| *C09D 5/02* | (2006.01) | |
| *C08F 220/28* | (2006.01) | |
| *C08F 220/56* | (2006.01) | |
| *C08K 3/013* | (2018.01) | |
| *C08K 3/34* | (2006.01) | |
| *C08K 5/00* | (2006.01) | |
| *C08K 5/17* | (2006.01) | |
| *C08K 5/544* | (2006.01) | |
| *C08K 9/06* | (2006.01) | |
| *C09D 7/63* | (2018.01) | |

(52) U.S. Cl.
CPC .......... *C09D 5/028* (2013.01); *C08F 220/283* (2020.02); *C08F 220/56* (2013.01); *C08K 3/013* (2018.01); *C08K 3/34* (2013.01); *C08K 5/0025* (2013.01); *C08K 5/17* (2013.01); *C08K 5/544* (2013.01); *C08K 9/06* (2013.01); *C09D 7/63* (2018.01)

(58) Field of Classification Search
CPC .......... C09D 5/028; C09D 7/63; C08K 3/013; C08K 3/34; C08K 5/0025; C08K 5/17; C08K 9/06; C08F 220/283; C08F 220/56
See application file for complete search history.

(56) References Cited

U.S. PATENT DOCUMENTS

| | | |
|---|---|---|
| 3,290,165 A | 12/1966 | Iannicelli |
| 3,567,680 A | 3/1971 | Iannicelli |
| 3,834,924 A | 9/1974 | Grillo |
| RE30,450 E | 12/1980 | Iannicelli |
| 6,080,802 A | 6/2000 | Emmons et al. |
| 6,176,918 B1 | 1/2001 | Glausch et al. |
| 6,177,493 B1 | 1/2001 | Maver |
| 6,214,467 B1 | 4/2001 | Edwards et al. |
| 6,268,420 B1 | 7/2001 | Maver |

(Continued)

FOREIGN PATENT DOCUMENTS

| | | | | |
|---|---|---|---|---|
| EP | 2261288 | | 12/2010 | |
| WO | 200063313 | | 10/2000 | |
| WO | WO-2013008691 A1 | * | 1/2013 | .......... C09D 11/322 |

*Primary Examiner* — Shuangyi Abu Ali

(57) ABSTRACT

One-component waterborne coating compositions or paint having an optional crosslinker and a reactive binder polymer that interacts with a functionalized pigment, wherein the reactive binder polymer is derived from at least one monomer having at least one reactive functional group that interacts with a functional linkage of the functionalized pigment to provide high physical durability performance, including improved resistance to burnish, mar and scratching.

13 Claims, 1 Drawing Sheet

(56) References Cited

U.S. PATENT DOCUMENTS

| | | |
|---|---|---|
| 6,869,996 B1 | 3/2005 | Krajnik et al. |
| 6,894,089 B2 | 5/2005 | Mei et al. |
| 7,056,449 B2 | 6/2006 | Hoefler |
| 7,081,488 B2 | 7/2006 | Bardman et al. |
| 7,179,531 B2 | 2/2007 | Brown et al. |
| 8,013,092 B1 | 9/2011 | Krajnik et al. |
| 8,298,659 B2 | 10/2012 | Anderson |
| 8,460,795 B2 | 6/2013 | Anderson et al. |
| 8,822,569 B2 | 9/2014 | Bardman et al. |
| 8,987,369 B2 | 3/2015 | Bekiarian et al. |
| 9,067,782 B2 | 6/2015 | Baran et al. |
| 9,969,900 B2 | 5/2018 | Moravek et al. |
| 2007/0135567 A1 | 6/2007 | Ruhoff et al. |
| 2010/0317819 A1 | 12/2010 | De Keyzer et al. |
| 2012/0108719 A1 | 5/2012 | Kozelj et al. |
| 2013/0150509 A1 | 6/2013 | Kozelj et al. |
| 2019/0352518 A1 | 11/2019 | Blossom et al. |
| 2022/0380604 A1* | 12/2022 | Kamau .................. C09C 3/006 |

\* cited by examiner

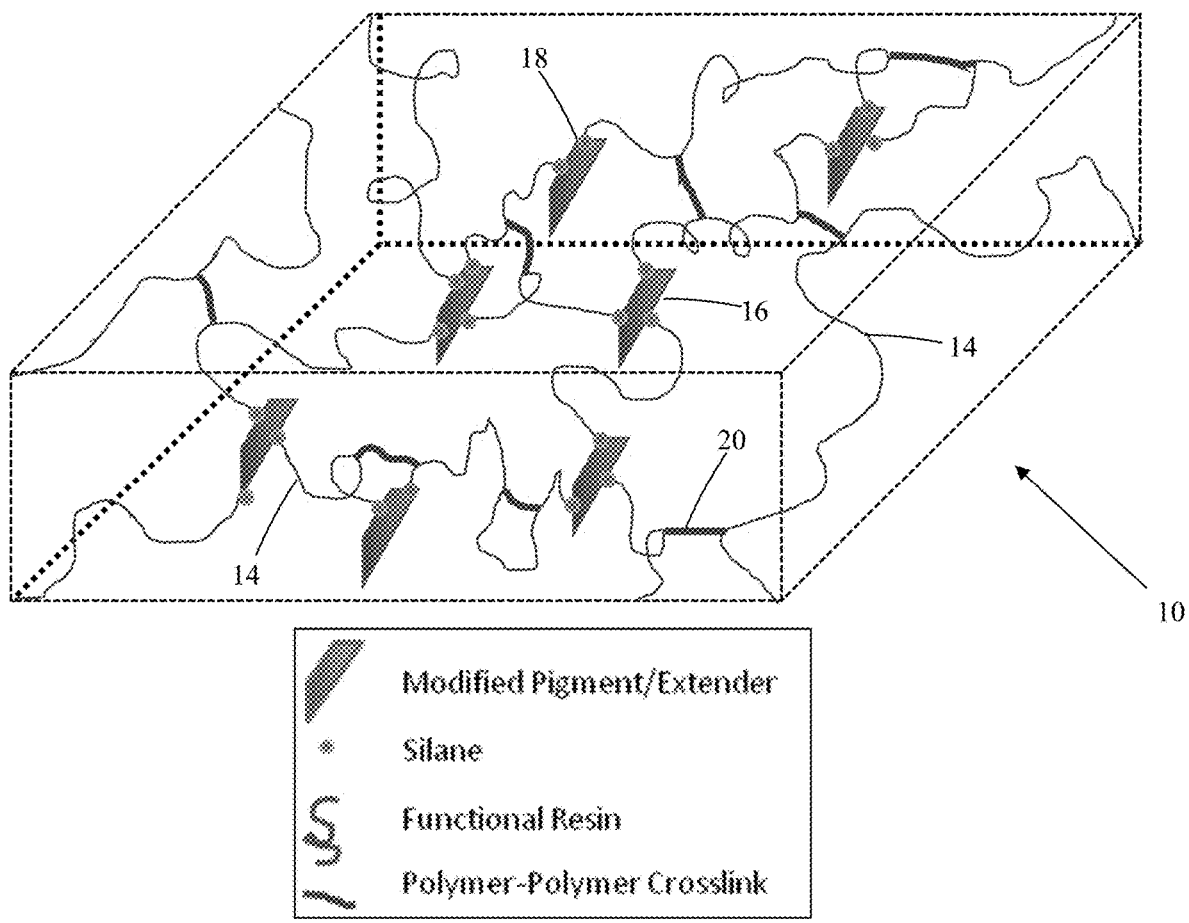

HIGH PHYSICAL DURABILITY COATING COMPOSITIONS

TECHNICAL FIELD

The present invention relates to one-component waterborne coating compositions that include a functionalized binder polymer and a functionalized pigment, particularly a binder polymer derived from at least one monomer having at least one reactive functional group that interacts with the functionalized pigment directly or via a crosslinker.

BACKGROUND

Pigments are used to impart color and control gloss in both solvent- and water-based coating compositions or paints. They can also contribute opacity, durability and hardness to coatings. They are typically added to paint as dry pigment powders or as a tinting concentrate or colorant composition, either during paint manufacture in a plant, or at a point of sale, where the retailer adds a colorant composition to a white or tintable base paint formulation to obtain a custom colored paint as per a customer's choice.

As the coatings industry has undergone a shift from oil/solvent-based paint to waterborne paint, there has been an increasing demand for coatings having various properties, especially for coatings having mechanical properties such as high hardness and good physical durability, including burnish, mar and scratch resistance. Compared to higher gloss paints, like satin, semi-gloss, and gloss paints, flat paint coatings are usually more prone to physical damage.

Existing approaches to improving physical durability of coatings include using polymer waxes, slip aids, and the like, but the benefits are limited. Two-component coatings can utilize a hardener, catalyst, crosslinker or activator to provide durability, but two-component coatings are not as convenient to a user as one-component coating compositions.

There is still a need in the coatings industry for one-component waterborne coatings that have improved physical durability, including burnish, mar and scratch resistance, particularly in low gloss, one-component waterborne coatings that are traditionally most susceptible to physical damage.

SUMMARY

The present invention provides one-component waterborne coating compositions that include a binder polymer derived from at least one monomer having at least one reactive functional group that can bind with or join to a functionalized pigment particle for use in paint.

Accordingly, in some aspects, the present invention provides paint or coating compositions that include a stable aqueous dispersion of a mixture of a reactive binder polymer, a plurality of functionalized pigment particles, and an optional crosslinker. In some aspects, the reactive binder polymer is derived from at least one monomer having at least one reactive functional group, each functionalized pigment particle comprises a base pigment having one or more functional linkages, and each functional linkage of each functionalized pigment particle is capable of interacting with a reactive functional group on the binder polymer either directly or via an optional crosslinker to bond the functionalized pigment particle to the binder polymer. In some aspects, the optional crosslinker is capable of providing a linkage between the reactive functional group of the binder polymer and the functional linkage of the functionalized pigment (optional crosslinker with reactive functional group and optional crosslinker with functional linkage). In some aspects, the same optional crosslinker is capable of reacting with two reactive functional groups on binder polymer to crosslink the binder polymer to itself or additional binder polymer.

Though the nature of the interaction is not fully understood, it is believed that each functional linkage is capable of being bonded to one reactive functional group on the binder polymer. In some aspects, the bond between the binder polymer and the pigment particles may be formed directly between the functional linkage on the functionalized pigment particle and the reactive functional group of the binder polymer. In some aspects, the bond between the binder polymer and the pigment particles may be formed by a crosslinker between the functional linkage on the functionalized pigment particle and the reactive functional group of the binder polymer.

In some aspects, the present invention provides a method of making a paint or coating composition by modifying a base pigment to provide a functionalized pigment (or "modified base pigment") having one or more functional linkages, providing a binder polymer derived from at least one monomer having at least one reactive functional group, and bonding the modified base pigment to the binder polymer. In some aspects, the bond between the binder polymer and the modified base pigment may be formed between the functional linkages of the functionalized pigment and the reactive functional groups of the binder polymer directly. In some aspects, a covalent bond may be formed between the functionalized pigment and the binder polymer. In some aspects, the bond between the binder polymer and the functionalized pigment may be formed by a crosslinker between the functional linkages of the functionalized pigment and the reactive functional groups of the binder polymer. In some aspects, bonds between binder polymer and functionalized pigment may be formed by a crosslinker between the functional linkages of the functionalized pigment and the reactive functional groups of the binder polymer and also directly between the reactive functional groups of the binder polymer and the functional linkages of the functionalized pigments. In some aspects, the method of making a paint or coating further includes adding additives, other pigments or binders, a carrier liquid, and/or other components to or with the modified base pigment and the binder polymer.

In some aspects, the functional linkage comprises a coupling agent, which may bond functional linkage to the functionalized pigment, and a crosslinkable functional group, which may interact with a reactive functional group, an optional crosslinker, or another functional linkage, depending on the nature of the crosslinkable functional group, to form a bond. In certain embodiments, the coupling agent of the functional linkage may be capable of bonding with the base pigment thereby providing a crosslinkable functional group attached to the modified base pigment, such that the crosslinkable functional group on the modified base pigment is capable of bonding directly with at least one reactive functional group of the binder polymer or bonding with at least one reactive functional groups via an optional crosslinker. Various combinations of reactive functional groups, optional crosslinkers, and functional linkages may be used as described further herein.

In some aspects, the functional linkage is formed from an aminosilane or aminosilanol material, wherein a siloxy or silanol group is the coupling agent capable of bonding with the base pigment, and an amino group of is the crosslinkable functional group capable of bonding with at least one reactive functional group of the binder polymer. In some aspects, the optional crosslinker is a compound having an amine moiety, wherein the amine moiety has a functionality of 2 or greater.

In some aspects, both the reactive functional group on the binder polymer and the crosslinkable functional group on the modified base pigment are diacetone acrylamide ("DAAM") groups. In some aspects, the crosslinkable functional group on the modified base pigment is bonded or crosslinked with the reactive functional group of the binder polymer via an optional crosslinker that may be at least one diamine, at least one triamine, at least one polymeric amine, and mixtures thereof. In some aspects, the crosslinkable functional group on the modified base pigment is capable of being bonded or crosslinked with the reactive functional group of the binder polymer by keto-hydrazide crosslinking via an optional crosslinker that may be at least one dihydrazide, at least one trihydrazide, at least one polyhydrazide, or mixtures thereof.

In some aspects, the reactive functional group on the binder polymer is acetoacetoxyethyl (meth)acrylate ("AAEM"), the optional crosslinker is an amine, and the functional linkage is formed from an aminosilane. In some aspects, the molar ratio of reactive functional group to total amine, the total amine defined as the combined molar amounts of the crosslinker and the aminosilane functional linkage in the coating composition, is in the range of about 0.3:1 to about 2:1. In some aspects, the molar ratio of optional crosslinker to aminosilane functional linkage in the coating composition is in the range of about 1.5:1 to about 5:1.

In some aspects, the present invention provides for coated articles having a dried film of the one-component waterborne coating composition. In some aspects, the coated articles having the dried film of the one-component waterborne coating composition have improved physical durability as compared to a substantially similar coating that does not contain the functionalized pigment or does not contain the binder polymer derived at least in part from monomers having a reactive functional group. In some aspects, the coated articles having the dried film of the one-component waterborne coating composition have improved burnish, mar, scratch resistance, or a combination thereof, compared to a substantially similar coating that does not contain the functionalized pigment or does not contain the binder polymer derived at least in part from monomers having a reactive functional group.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1 is a schematic diagram illustrating the structure of a film formed from a one-component waterborne coating composition or paint according to certain embodiments of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The terms "a," "an," "the," "at least one," and "one or more" are used interchangeably. Thus, for example, a coating composition that contains "an" additive means that the coating composition includes "one or more" additives.

The term "ambient curable" or "ambient cured" as used herein refers to coating compositions or paints that, following application to a substrate, are capable of curing in the presence of ambient air, the air having a relative humidity of 10 to 100 percent, such as 25 to 80 percent, and a temperature in the range of −10° C. to 60° C., such as 5° C. to 50° C., in some aspects 10° C. to 45° C., and in some preferred aspects 15° C. to 40° C. As used herein, the term "cure" refers to a coating composition or paint wherein any crosslinkable components of the composition are at least partially crosslinked.

The term "architectural paint" means paints for use on interior or exterior walls, trim, floors, ceilings or furniture.

The term "binder" or "binder polymer" means a natural or synthetic polymer derived from one or more monomers suitable for use in paints and other coating compositions to form dried, cured or otherwise hardened coatings in which the binder may represent a continuous phase.

The term "bonded to" or "binds to" or "forms a bond" as used in this specification means association of two or more molecules by means of a chemical interaction. For example, the term could refer to covalent bonding directly between two molecules, the joining of two molecules via each molecule being covalently bonded to a third, intermediate, crosslinking molecule. Other interactions beside covalent bonding may provide the necessary association.

The terms "board" or "fiberboard" refer to a generally planar component suitable for attachment to a building exterior surface, including lap siding, vertical siding, soffit panels, trim boards, shingle replicas, stone replicas and stucco replicas.

The term "cementitious" refers to a substrate or material that comprises cement and has the properties or characteristics of cement, or that comprises a chemical precipitate, preferably of carbonates, having the characteristics of cement. Examples of cementitious substrates and materials include cement, burnished cement, concrete, polished concrete and cement fiberboard, and examples of places or applications where cementitious substrates may be employed include floors (e.g., garage floors), tiles (e.g., floor tiles), decks, boards and panels (e.g., fiber cement boards), and the like.

The term "comprises" and variations thereof does not have a limiting meaning where such term appears in the description or claims. Thus, a composition comprising an ethylenically unsaturated compound means that the composition includes one or more ethylenically unsaturated compounds.

The term "derived from" when used in reference to a polymer or copolymer and one or more monomers means that the polymer or copolymer is made from or could be made from ingredients that include the named one or more monomers.

The term "dispersion," as used herein, in the context of a dispersible polymer refers to the mixture of a dispersible polymer and a carrier.

The term "gloss" as used herein refers to the specular reflectance from a planar surface. Gloss is determined by projecting a beam of light of fixed intensity and angle onto a surface and measuring the amount of reflected light at an equal but opposite angle. As used herein, gloss is measured at an 85-degree angle using the procedure detailed in ASTM D523-14 (Standard Test Method for Specular Gloss). This measurement may also be discussed as the "85-degree sheen."

The terms "group" and "moiety" are used to differentiate between chemical species that allow for substitution or that may be substituted and those that do not allow substitution or that may not be so substituted. Thus, when the term "group" is used to describe a chemical substituent, the described chemical material includes substituted and unsubstituted groups, where the substituent groups may include O, N, Si, or S atoms, for example, in the chain (e.g., an alkoxy group) as well as carbonyl groups and other substituent groups. The term "organic group" thus refers to a hydrocarbon (e.g., hydrocarbyl) group with optional elements other than carbon and hydrogen in the chain, such as oxygen, nitrogen, silicon or sulfur. Representative organic groups include aliphatic groups, cyclic groups, and combinations of aliphatic and cyclic groups (e.g., alkaryl or aralkyl groups). The term "aliphatic group" refers to a saturated or unsaturated linear or branched organic group. For example, this term is used to encompass alkyl, alkenyl, and alkynyl groups. The term "alkyl group" refers not only to pure open chain saturated hydrocarbon alkyl substituents, such as methyl, ethyl, isopropyl, t-butyl, heptyl, dodecyl, octadecyl, amyl, 2-ethylhexyl, and the like, but also to substituted alkyl groups having substituents known in the art, such as hydroxy, alkoxy, alkylsulfonyl, halo, cyano, nitro, amino, carboxyl, and the like. The term "alkenyl group" refers to an unsaturated linear or branched hydrocarbon group with one or more carbon-carbon double bonds and likewise may have substituents known in the art. Non-limiting examples of alkenyl groups include groups such as vinyl, 1-propenyl, 2-propenyl, 1,3-butadienyl, 1-butenyl, 2-butenyl, 1-pentenyl, 2-pentenyl, 1-hexenyl, 2-hexenyl, heptenyl, octenyl and the like. The term "alkynyl group" refers to an unsaturated linear or branched hydrocarbon group with one or more carbon-carbon triple bonds and likewise may have substituents known in the art. Non-limiting examples of alkynyl groups include ethynyl, 1-propynyl, 2-propynyl, 1-butynyl, 2-butynyl, 3-butynyl, 1-pentynyl, 2-pentynyl, 1-hexynyl, 2-hexynyl, heptynyl, octynyl and the like. The term "cyclic group" refers to a closed ring hydrocarbon group that can be classified as an alicyclic group, aromatic group (aryl group), or heterocyclic group. The term "alicyclic group" refers to a cyclic hydrocarbon group having properties resembling those of aliphatic groups. Non-limiting examples of alicyclic groups include cyclopropyl, cyclobutyl, cyclopentyl, cyclohexyl, cycloheptyl, cyclooctyl and the like. The terms "aromatic group" or "aryl group" refer to a mono- or polycyclic aromatic hydrocarbon group including phenyl or naphthyl groups. The term "heterocyclic group" refers to a closed ring hydrocarbon group in which one or more of the atoms in the ring is an element other than carbon (e.g., nitrogen, oxygen, sulfur, etc.). When the term "moiety" is used to describe a chemical compound or substituent, only the unsubstituted chemical material is intended to be included. Thus, the phrase "hydrocarbyl moiety" refers to unsubstituted organic moieties containing only hydrogen and carbon, and the phrase "alkyl moiety" refers to pure open chain saturated hydrocarbon alkyl substituents such as methyl, ethyl, propyl, t-butyl, and the like.

A "latex" as used in relation to a polymer or polymer dispersion means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. In some embodiments, a reactive dispersing or emulsifying agent may become part of the polymer particles as they are formed.

The phrase "low VOC" when used with respect to a liquid coating composition means that the coating composition contains less than 20 weight % volatile organic compounds, more preferably less than 10 weight % volatile organic compounds, and most preferably less than 4 weight % volatile organic compounds based upon the total liquid coating composition weight. As the phrase "low VOC" may differ by coating market segment, however, the term may also be defined as it applies in a relevant market segment.

Unless otherwise indicated, a reference to a "(meth) acrylate" compound (where "meth" is in parentheses or bracketed) is meant to include both acrylate and methacrylate compounds.

The term "monomer" means a reactive organic molecule that can bond covalently to other molecules or to itself to form an oligomer or a polymer containing a plurality of units (e.g., a plurality of repeating units) derived from the monomer.

The term "one-component," as used herein refers to coating compositions in which all of the composition components are stored together in a single container and which are storage stable, which means that any reaction of the components in the container is minimal or does not adversely affect product performance such that the viscosity of the composition does not significantly increase over time to the point in which the composition is no longer suitable for convenient use for applying as a coating. A 15 KU increase in viscosity as measured by a stormer viscometer according to ASTM D562-10 (2018) ("Standard Test Method for Consistency of Paints Measuring Krebs Unit (KU) Viscosity Using a Stormer-Type Viscometer") may indicate instability. The term "paint" means a coating composition including pigment and binder which when applied to form a thin (e.g., 100 µm) wet thickness coating film on a freshly-sanded smooth wood surface, will, when dried, hide both the wood grain and its texture and will present a new surface with its own appearance.

The term "pigment" includes both organic and inorganic dispersible solid particulate materials that function by reflecting light and dispersible materials that function by absorbing light, wherein the material imparts visually noticeable color and/or opacity to a base paint when 5 weight percent ("wt. %") (in the case of a dispersible solid particulate) of the material is added to a paint composition. The presence or absence of visually noticeable color and/or opacity may be assessed by preparing drawdown samples of the base paint with and without the pigment, casting such samples as 25 µm dry thickness coated films over the white part of a BYK-Gardner No. PA-2811 opacity drawdown chart (from BYK-Gardner USA) or comparable chart, and examining the coated films under normal overhead interior illumination. Pigments can be optically transparent in some films, depending on the pigment, and do not always reflect or absorb light. Pigments can be used to impart non-optical properties such as hardness, lower cost, and improve chemical resistance.

The term "pigment volume concentration" when used in respect to a paint, stain or colorant means the total percentage of dried coating volume occupied by all pigment species in the coating.

The terms "polymer" and "polymeric" include polymers as well as copolymers of two or more monomers.

The terms "preferred" and "preferably" refer to embodiments which may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "substantially free," when applied to components of a composition and not to VOC levels, refers to compositions of the present invention containing no more than about 5 wt. % of a particular component, based on total weight of solids in the composition. For example, a composition of the present invention that is substantially free of coalescent contains no more than about 5 wt. % coalescent. A composition of the present invention that is essentially free of a coalescent component, for example, contains no more than about 0.5 wt. % of the coalescent compound. When applied to VOC levels, the term "substantially free," refers to compositions of the present invention that contain less than about 50 g/L VOCs. Unless otherwise indicated, the terms "low-VOC" and "substantially free of VOC" are used interchangeably herein. The term "essentially free of VOC" refers to compositions of the present invention that contain less than 5 g/L of VOCs. The terms, "zero VOC" and "essentially free of VOC" are used interchangeably herein.

The terms "topcoat" or "final topcoat" refer to a coating composition which when dried or otherwise hardened provides a decorative or protective outermost finish layer on a substrate, e.g., a fiber cement board attached to a building exterior. By way of further explanation, such final topcoats include but are not limited to external paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated, viz., without a topcoat.

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") is as measured by ASTM method D2369-90, refers to the weight of VOC per volume of the coating solids, and is reported, for example, as grams VOC per liter (g/L).

The term "waterborne" when used with respect to an aqueous emulsion, coating composition or paint means that the major volatile liquid vehicle or carrier for such aqueous emulsion or coating composition is primarily or principally water. For example, in certain aspects of the coating compositions, the carrier fluid is at least 50 weight percent water, and preferably at least 80 weight percent water.

As used herein, the term "wet/dry adhesion" refers to the percent of a dried film coating removed from a substrate surface. The dried film coating typically has an area immersed in water for a period of time (wet adhesion) prior to performance of a cross hatch adhesion test and an area that was not immersed in water (dry adhesion) prior to performance of the test. ASTM D3359 (Standard Test Methods for Measuring Adhesion by Tape Test) may be used to measure wet/dry adhesion.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a series of endpoints includes disclosure of not only that range but also all subranges subsumed using such endpoints and also within that range (e.g., 1 to 5 includes 1 to 4, 2 to 3.80, 1.5 to 5, etc.).

Referring to FIG. 1, a film 10 formed from a one-component waterborne coating composition or paint according to certain embodiments of the present invention is illustrated in a schematic diagram for illustrative purposes. Film 10 includes a binder polymer 14 connected to a plurality of modified pigment or extender particles 16 by functional linkages 18 between the binder polymer 14 and the modified pigment or extender particles 16. An optional crosslinker 20 may also crosslink different portions of the binder polymer 14. While the following disclosure refers to modified pigment particles, the disclosure is also applicable to modified extender particles as that term is used in the relevant art.

The disclosed coating compositions and paints are particularly suited for one-component applications to a variety of substrates, including architectural surfaces of interior or exterior substrates, including walls, trim, floors, ceilings, furniture, cement, cement tiles, and fiber cement substrates. The compositions may also be applied to wood and wood substitutes, metal, semi-rigid and flexible plastics, rubber, leather, glass fiber sizing, printing inks, and adhesives. Due to the water-dispersibility of the polymers used in the present invention, the coating compositions and paints may be useful in waterborne formulations and may also be useful in coating applications requiring low or substantially zero VOC levels. Some embodiments of the coating compositions and paints are particularly suited where excellent toughness, chemical and water resistance, and rapid dry times may be required.

The coating compositions are particularly useful for architectural flat paints. In some aspects, the architectural flat paints of the present invention have a sheen measured at 85-degrees of 5 or less, in some aspects of 4 or less.

The disclosed articles may be coated on one or more surfaces with one or more layers of the coating composition. For example, in one preferred embodiment the coating composition may be applied to an optional primer layer and/or be coated with one or more topcoat layers. An optional sealer layer underneath the primer layer may also be utilized, if desired. Preferably, the various layers are selected to provide a coating system that has good adhesion to the substrate and between adjacent layers of the system.

Binder Polymer

In certain aspects, the binder polymer of the coating or paint compositions described herein preferably are a stable aqueous dispersion of one or more polymers, resins or monomers. The stable aqueous polymer dispersions may be latex polymer dispersions (e.g., emulsion of polymer particles) or polyurethane polymer dispersions.

The latex polymer dispersions may be single stage or multistage polymers.

The latex polymer dispersions preferably include one or more, typically two or more, ethylenically unsaturated monomers. In certain aspects, the latex polymer dispersions may include one or more, more preferably two or more, polymerization products of ethylenically unsaturated monomers, such as, for example, (meth)acrylates (e.g. alkyl and alkoxy (meth)acrylates), cycloaliphatic (meth)acrylates (e.g. cyclohexyl (meth)acrylate), aryl (meth)acrylates (e.g., benzyl (meth)acrylate), vinyl esters of saturated carboxylic acids, monoolefins, conjugated dienes, polyfunctional acrylates, and the like, styrene, methyl methacrylate, alkyl(meth)acrylates, vinyl acetate, acrylonitrile, vinyl chloride, other suitable vinyl monomers and the like. In an embodiment, latex polymer dispersions optionally include one or more polyfunctional (meth)acrylate monomers (e.g., one or more multi-ethylenically unsaturated (meth)acrylates). In an embodiment, the latex polymer dispersions also include one or more ethylenically unsaturated carboxy-functional amide monomers, e.g., ureido-functional monomers, such as monomers formed as the product of the reaction between aminoalkyl alkylene urea (e.g., amino ethylene urea, for example) with an ethylenically unsaturated carboxylic acid or anhydride (e.g., maleic anhydride, for example).

Exemplary ethylenically unsaturated monomers for use in making the latex polymer dispersions include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth) acrylamide, styrene, a-methyl styrene, vinyl toluene, vinyl acetate, vinyl propionate, allyl methacrylate, and mixtures thereof. Preferred monomers include methyl methacrylate, methacrylic acid, diacetone acrylamide, butyl acrylate, butyl methacrylate, and the like.

Exemplary polyfunctional acrylates include, for example, di-, tri- and tetra-functional acrylates such as hexanediol diacrylate (HDODA), dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerythritol tetraacrylate, and the like. Exemplary polyfunctional methacrylates include 1,3-butanediol dimethacrylate, 1,6-hexanediol dimethacrylate, diurethane dimethacrylate, ethylene glycol dimethacrylate, mixtures thereof, and the like.

In a preferred embodiment, the ethylenically unsaturated monomers for use in making the latex polymer dispersions include 30-40% methyl methacrylate, 0-20% styrene, 35-45% 2-Ethylhexyl acrylate, 1-4% methacrylic acid, and 1-12% AAEM, 2-8% DAAM, or a mixture of AAEM and DAAM that is in total 1-12% by weight of the monomer mix.

The latex polymer dispersions (e.g., emulsion of polymer particles) or polyurethane polymer dispersions of the present invention are derived at least in part from one or more monomers having at least one reactive functional group. In some aspects, the reactive functional group may include diacetone acrylamide (DAAM), 2-(acetoacetoxy)ethyl methacrylate (AAEM), or mixtures thereof. DAAM and AAEM are functional monomers that have a carbonyl group within the molecule.

In some aspects, the binder polymer may comprise one or more monomers having at least one reactive functional group in an amount ranging from about 1 wt-% to about 12 wt-%, in some aspects about 1.5 wt-% to about 10 wt-%, and in some other aspects about 2 wt-% to about 8 wt-%, of the total weight of the monomer mix for the binder polymer.

As discussed in more detail below, the reactive functional group on the binder polymer allows the binder polymer to be bound to the functional linkage of the modified pigment particle. Though the nature of the interaction is not fully understood, it is believed that each functional linkage is capable of being bonded to one reactive functional group on the binder polymer. In some aspects, the reactive functional group on the binder polymer allows the binder polymer to be directly bonded to the functional linkage of the modified pigment particle, while in some other aspects, an intermediate, optional crosslinker is used to bond the reactive functional group of the binder polymer to the functional linkage of the modified pigment particle.

Modified Pigment/Extender

In certain aspects, the modified pigment or extender of the coating compositions or paints described herein are preferably derived from one or more pigments or extenders. Pigments and/or extenders suitable for being modified with functional linkages and used in the coating compositions and paints of the present invention will be known to persons having ordinary skill in the art or can be determined using standard methods.

Exemplary pigments or extenders include titanium dioxide white (rutile or anatase), clay, glass beads, glass fibers, talc, silicas, feldspar, mica, ceramic microspheres, calcium metasilicates, and the like.

In certain aspects, the modified pigments or extenders are derived from one or more of nepheline syenite, aluminum hydroxide, alumina cristobalite, fumed silica, kaolin, precipitated silica, quartz, wollastonite, glass spheres, glass bubbles, magnesium hydroxide, mica, talc, titanium dioxide, polymer-pigment composite particles, wax-pigment composites, and mixtures thereof. In some preferred aspects, the extender is nepheline syenite, such as MINEX® 4 Nepheline Syenite available from Sibelco Company headquartered in Antwerp, Belgium.

In some aspects, one or more of the foregoing pigments and extenders is modified with a functional linkage that comprises a coupling agent and a crosslinkable functional group to provide a modified pigment or modified extender having a functional linkage. The coupling agent is bonded to the base pigment or extender on one end of the functional linkage thus providing a functionalized pigment that may bond with a reactive functional group of the binder polymer or a crosslinker.

In some aspects, the coupling agent is a silane coupling agent, a titanate coupling agent, an aluminate coupling agent, a zirconate coupling agent, or mixtures thereof. In some aspects, the coupling agent attached to the pigment or extender provides a modified pigment or extender having a functional linkage with a crosslinkable functional group end chosen from an amino group, DAAM, AAEM, an epoxy group, an acrylate group, or the like.

In some aspects, suitable amino-functional silanes for use in the present invention include functional linkages with silane coupling agents having the formula

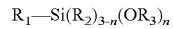

where n is 2 or 3, the $R_1$ group is alkyl, cycloalkyl, phenyl, cycloalkylalkyl, alkenylcycloalkyl, alkenylphenyl (e.g., benzyl), or phenylalkyl (e.g., tolyl), and wherein the $R_1$ group further contains at least one amino group. Each $R_2$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Wherein the $R_1$ and $R_2$ groups can also be silane oligomers. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred amino-functional silanes have an average molecular weight of from about 140 to about 500, more preferably from about 150 to about 300. Practical considerations such as solubility, hydrolysis rate, compatibility with the coating composition, polymer stability, and the like, may be considered when selecting the structure and molecular weight of the silane. In one embodiment, it is preferred that the molecular weight not exceed a maximum of about 190 to about 250, n is 3, $R_3$ is a hydrogen, methyl or ethyl group and $R_1$ is an alkyl group having from 3 to 8 carbon atoms and contains no more than one amino group.

In some preferred aspects, the functional linkage is an aminosilane or aminosilanol, such that the functional linkage has a siloxy group attached to the base pigment or extender and an amino group that is capable of bonding with the reactive functional group of the binder polymer or an intermediate crosslinker that also binds with the reactive functional group of the binder polymer. The amino group can be a primary or secondary amine.

Exemplary amino-functional silanes include trimethoxysilylpropyldiethylenetriamine, N-methylaminopropyltrimethoxysilane, aminoethylaminopropylmethyldimethoxysilane, amino-ethylaminopropyltrimethoxysilane (available from Dow Corning as Z-6020), aminopropylmethyldimethoxysilane, aminopropyltrimethoxysilane, aminoethylaminoethylaminopropyl-trimethoxysilane, N-methylaminopropyltrimethoxysilane, methylaminopropyltrimethoxysilane, aminopropylmethyldiethoxysilane, aminopropyltriethoxysilane, 4-aminobutyltriethoxysilane, m-aminophenyltrimethoxysilane, aminoethylaminopropyltriethoxysilane, aminoethylaminoiso-butylmethyldimethoxysilane, hydrolyzates of the above and the like.

In some further aspects, additional exemplary functional silanes not requiring an amine moiety may be used. These include (3-acryloxypropyl)trimethoxysilane, gamma-methacryloxypropyltrimethoxysilane, gamma-mercaptopropyltriethoxysilane, and olefinic silanes, such as vinyltrialkoxysilane, vinyltriacetoxysilane, alkylvinyldialkoxysilane, allyltrialkoxysilane, hexenyltrialkoxysilane and the like.

The disclosed coating compositions preferably include a silane functional linkage in an amount of at least about 0.25 weight %, more preferably at least about 0.5 weight %, and even more preferably at least about 0.75 weight %, based on the weight of the latex polymer (polymer solids). The disclosed coating compositions preferably include a silane in an amount of less than about 10 weight %, more preferably less than about 6 weight %, and even more preferably less than about 4 weight %, based on the weight of the latex polymer.

In some aspects, the crosslinkable functional group of the functional linkage is an epoxy functional group that may react with an acetoacetoxy functionality reactive functional group on the binder polymer or an intermediate crosslinker, and the coupling agent is a silane. Suitable epoxy-functional silanes for use in the present invention include silanes having the formula $R_1Si(R_2)_{3-n}(OR_3)_n$, where n is 2 or 3, the $R_1$ group is alkyl, cycloalkyl, phenyl, cycloalkylalkyl, alkenylcycloalkyl, alkenylphenyl (e.g., benzyl), or phenylalkyl (e.g., tolyl), wherein the $R_1$ group further contains at least one epoxy group. Each $R_2$ group is independently hydrogen, alkyl, cycloalkyl, phenyl, cycloalkylalkyl, alkenylcycloalkyl, alkenylphenyl (e.g., benzyl), phenylalkyl (e.g., tolyl), or a silane oligomer. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred epoxy-functional silanes have an average molecular weight of from about 140 to about 500, more preferably from about 150 to about 300. Practical considerations such as solubility, hydrolysis rate, compatibility with the coating composition, polymer stability, and the like, may be considered when selecting the structure and molecular weight of the silane. In one embodiment, it is preferred that the molecular weight not exceed a maximum of about 190 to about 250, that $R_2$ is a methoxy or ethoxy group and that $R_1$ is an alkyl group of 3 to 8 carbon atoms and contains no more than one epoxy group.

Exemplary epoxy-functional silanes include 8-(3,4 epoxycyclohexyl)-ethyltrimethoxysilane (available from Mitsubishi International Corporation as KBM303), r-glycidoxypropyl-trimethoxysilane (available from Mitsubishi International Corporation as KBM403), r-glycidoxypropylmethyldiethoxysilane (available from Mitsubishi International Corporation as KBE402), glycidoxypropyltrimethoxysilane (available from Dow Corning as Z-6040), glycidoxypropyltriethoxysilane (available from Dow Corning as Z-6041), γ-glycidoxy-propyltriethoxysilane (available from GE Silicones as Silquest™ A-187), glycidoxypropylmethyldimethoxysilane (available from Dow Corning as Z-6044), glycidoxy-propylmethyldiethoxysilane (available from Dow Corning as Z-6042), and epoxycyclohexylethyltrimethoxysilane (available from Dow Corning as Z-6043), 5,6-epoxyhexyltriethoxysilane (available from Gelest, Inc. as SIE4675.0), hydrolyzates of the above and the like.

In another embodiment of the present disclosure, the functional linkage comprises a titanate coupling agent. Titanate functional linkages may preferably have the formula:

$X_5O_{(4-n)}—Ti—(OY_5—Y_6—Y_7)_n$ wherein $X_5O$ is a hydrolyzable short chain alkoxy, preferably $C_{1-6}$ alkyloxy, such as methoxy and ethoxy; $OY_5$ is a carboxyl, sulfonic, or phosphate group; $Y_6$ is a long chain alkyl group, preferably $C_{12-24}$ alkyl, such as lauryl, cetyl or stearyl; $Y_7$ is a hydroxyl, thiol, amino, or epoxy group; and n is 2 or 3.

In another embodiment of the present disclosure, the functional linkage comprises an aluminate coupling agent. Distearoyl isopropoxy aluminate, trimethyl aluminate, triisopropyl aluminate, tribenzyl aluminate or a mixture thereof may be used as aluminate-containing functional linkages.

In the surface modification of the base pigment or extender with the functional linkage, those skilled in the art may determine the conditions for surface modification of the base pigment or extender with functional linkage, including use of solvents, reaction temperature, reaction time, and the like, based on the type of base pigment or extender and functional linkage.

In some preferred aspects, the step of surface modifying the base pigment or extender with a functional linkage is performed by milling the functional linkage with the base pigment or extender for a period of time to provide a milled composite and then baking the milled composite for a period of time to provide the modified pigment or extender with the functional linkage. For example, in some preferred aspects, the functional linkage can be added in an amount between about 0.5 wt-% to about 5.0 wt-% of the total functionalized pigment. In a preferred embodiment, 1.5 wt-% of aminosilane functional linkage is added to nepheline syenite and milled for about 2 hours, followed by baking at 80° C. for about 1 hour to provide the modified pigment. The modified pigment or extender can then be ground to a desired size.

The modified pigment or extender can also be provided by adding the functional linkage directly to the base pigment or extender dispersion. In some other preferred aspects, the step of surface modifying-pigment is accomplished as described in the Examples as the Wet Milling Process.

Functional linkage is present in paints or coatings compositions in an amount that is dependent on PVC of the paint or coating composition to which modified pigments or extenders are added. In some embodiments, functional linkage comprises 0.2 wt-% to 3 wt-%, more preferably 0.4 wt-% to 2 wt-% and most preferably 0.6 wt-% to 1.8 wt-% on a wet formulation basis. In any event, one having skill in the art will understand from this disclosure that the lower bound of functional linkage as a weight percent of total paint composition weight will be selected for the minimum pigment or extender functionalization that shows a positive effect in durability and will be dependent on the amount of pigment or extender in the formulation, which is selected based on the desired sheen. One having skill in the art will understand from this disclosure that the upper bound of functional linkage as a weight percent of total paint composition weight will be selected for the maximum amount of functional linkage that can be bonded to the relevant base pigment. This measure is dependent on the amount of pigment or extender in the formulation (selected based on desired sheen), the pigment or extender type (smaller pigments/extenders have greater surface area for the same mass and thus may have a higher degree of potential functionalization), and the stoichiometry of any reaction between the reactive functional group of the polymer binder, the optional crosslinker, and the crosslinking functional group of the functional linkage on the modified pigments or extenders.

In some aspects, one or more of the foregoing base pigments or extenders may also be present in an unmodified form.

Optional Crosslinker

In some embodiments, the compositions herein include an optional crosslinker. Preferred optional crosslinkers may be at least one diamine, at least one triamine, at least one polymeric amine, at least one dihydrazide, at least one trihydrazide, at least one polyhydrazide and mixtures thereof.

The crosslinker is described herein as an "optional crosslinker," in the sense that a crosslinker is required for binding of the functionalized pigment and reactive binder polymer in some embodiments but is not required for binding between the functionalized pigment and reactive binder polymer in others. Generally, the optional crosslinker is capable of providing and likely does provide crosslinking between reactive functional groups of the binder polymer. Systems with AAEM as the reactive functional group and DAAM as the crosslinkable functional group, DAAM as the reactive functional group and AAEM as the crosslinkable functional group, and DAAM as both the reactive functional group and the crosslinkable functional group require an optional crosslinker to yield bonded modified pigment and reactive polymer binder in theory. Systems with AAEM as the reactive functional group and amine as the crosslinkable functional group, DAAM as the reactive functional group and amine as the crosslinkable functional group, and AAEM as both the reactive functional group and the crosslinkable functional group do not require an optional crosslinker to yield bonded modified pigment and reactive polymer binder in theory.

In some aspects, the crosslinkable functional group of the modified pigment is an amine, and the optional crosslinker is a diamine. The molar ratio of reactive functional group from the binder polymer to total amine, wherein total amine is defined as the combined molar amounts of amine optional crosslinker and aminosilane functional linkage in the coating composition, is in the range of about 0.3:1 to about 2:1 and is preferably about 0.6:1 to about 1.4:1. In some aspects, the molar ratio of an amine crosslinker to aminosilane in the coating composition is in the range of about 1.5:1 to about 5:1, and preferably 2:1 to about 4:1.

Without wishing to be bound by theory, it is believed that this relationship is borne out in part by the stoichiometric effect between the amine moiety of the modified pigment or extender, the amine of the optional crosslinker, and the reactive functional group. Amine on the modified pigment and amine from crosslinker appear to compete for reactive functional group on the binder polymer. Too much of one relative to the other results in an inferior system with poorer performance characteristics.

Reaction of Base Polymer and Modified Pigment/Extender (Directly or Via Crosslinker)

In some preferred aspects, the binder polymer reacts directly with the modified pigment or extender. For example, a latex polymer dispersion may be derived from 2-(acetoacetoxy)ethyl methacrylate (AAEM), diacetone acrylamide (DAAM), or a mixture thereof and other monomers, such that the binder polymer comprises DAAM or AAEM as the reactive functional group(s). A base pigment or extender may be modified with an aminosilane functional linkage, such that a siloxy group of the aminosilane functional linkage is bonded to the base pigment or extender and an amino crosslinkable functional group of the aminosilane functional linkage is capable of bonding directly with the reactive functional group of the binder polymer. The bond between the functional linkage and the reactive functional group may be a covalent bond between the pigment or extender and the binder polymer. As shown in Reaction I, below, an AAEM reactive functional group of the binder polymer and an amine crosslinkable functional group of the modified pigment may react directly to form a bond between the two. In the embodiment shown in in Reaction I, a diamine is used as an optional crosslinker. Diamine will allow crosslinking between AAEM reactive functional groups but will not react with the amine from the aminosilane, thus crosslinking binder polymer to binder polymer.

(Reaction I)

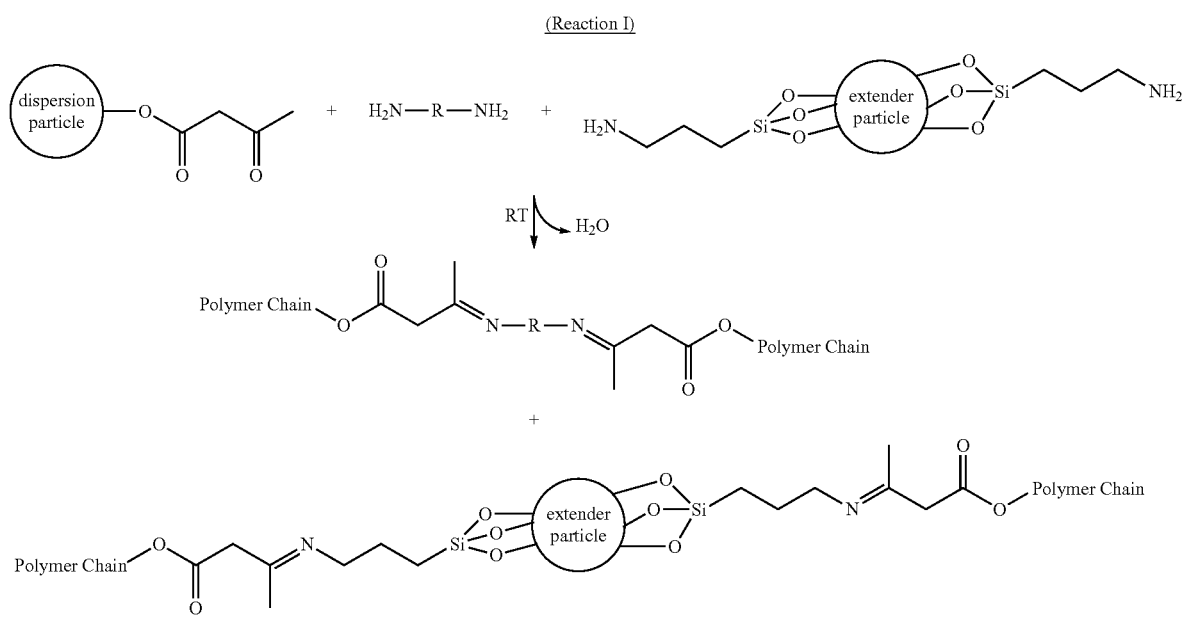

In some embodiments, the binder polymer is derived from one or more monomers capable of bonding directly with the modified pigment or extender or by an intermediate crosslinker. For example, a latex polymer dispersion may be derived from 2-(acetoacetoxy)ethyl methacrylate (AAEM) and other monomers, such that the binder polymer comprises a reactive AAEM group as the reactive functional group. A base pigment or extender may be modified with a silane-based functional linkage, wherein the functional linkage further comprises an AAEM functional group. The AAEM reactive functional group on the binder polymer may bond directly with the AAEM crosslinkable functional group on the functionalized pigment. The AAEM reactive functional group and AAEM crosslinkable functional group will also bond to either an amine optional crosslinker or an azide optional crosslinker. Thus, either an amine or an azide crosslinker may bond polymer to pigment or binder polymer to binder polymer in such a system.

In some embodiments, the binder polymer is derived from one or more monomers capable of bonding with the modified pigment or extender by an intermediate crosslinker using a keto-hydrazide crosslinking reaction. For example, a latex polymer dispersion may be derived from diacetone acrylamide (DAAM) and other monomers, such that the binder polymer comprises at least one diacetone acrylamide group as the reactive functional group. A base pigment or extender may be modified with a functional linkage comprising a silane coupling agent and a DAAM crosslinkable functional group, such that a siloxy group of the silane coupling agent bonds to the base pigment or extender and a diacetone acrylamide group is provided on the other end of the functional linkage. Since both the binder polymer and the modified pigment or extender contain a diacetone acrylamide group, an optional crosslinker (here, adipic acid dihydrazide (ADH)) can be used to bond the binder polymer and the modified pigment or extender via keto-hydrazide crosslinking, as shown in Reaction II below. The optional crosslinker may also crosslink polymer binder to polymer binder or modified pigment directly to modified pigment, as shown below in Reaction II.

(Reaction II)

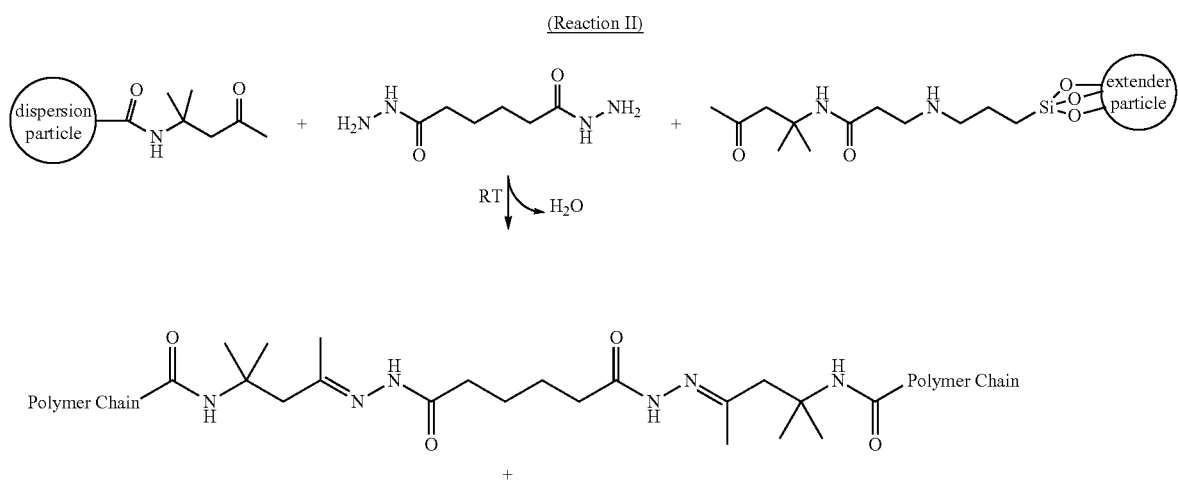

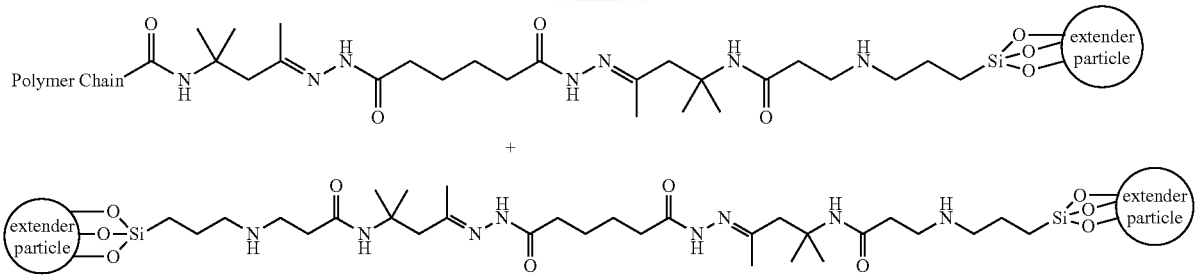

In certain aspects, the keto-hydrazide crosslinking reaction can occur with adipic acid dihydrazide, carbohydrazide, mixtures thereof, and the like. Other exemplary dihydrazides that are contemplated to perform the keto-hydrazide crosslinking reaction individually, or as mixtures, have a C0-C10 backbone between two reactive C=ONHNH2 groups. For example, oxalyl dihydrazide has n=0 and does not have a carbon backbone between the two reactive C=ONHNH2 groups, succinic dihydrazide has n=2 and has a straight C2 backbone, adipic acid dihydrazide has a straight C4 backbone, isophthalic dihydrazide has a C6 benzene ring backbone, azelaic dihydrazide has a straight C7 backbone, sebacic dihydrazide has a straight C8 backbone, and dodecanedioic dihydrazide has a straight C10 backbone Preferred latex polymers include at least about 0.5 wt. % of the one or more monomers capable of crosslinking by the keto-hydrazide crosslinking reaction, more preferably about 0.5 wt % to about 8 wt. %, and most preferably about 2 wt. % to about 12 wt. % based on the total weight of monomers used to form the latex polymer.

Other Components

As discussed above, the coating compositions and paints of the present invention may comprise one or more optional pigments or extenders that have not been modified. Pigments suitable for use in the coating compositions will be known to persons having ordinary skill in the art or can be determined using standard methods. Exemplary pigments include titanium dioxide white.

In certain embodiments it is advantageous to include extenders, fillers or inert ingredients in the coating composition. Fillers or inert ingredients extend, lower the cost of, alter the appearance of, or provide desirable characteristics to the composition before and after curing. Exemplary fillers or inert ingredients include, for example, clay, glass beads, talc, silicas, feldspar, mica, ceramic microspheres, calcium metasilicates, and the like. For example, the composition may include abrasion resistance promoting adjuvants such as silica or aluminum oxide (e.g., synthetic or refined aluminum oxide).

The disclosed coating compositions may include waxes to improve coating physical performance or rheology control agents to improve application properties. Exemplary waxes include AQUACER 513, AQUACER 1547, AQUAMAT 208 from Byk Chemie; LANCO™ 138° F., LANCO™ 1588 SF from the Lubrizol Corporation; PropylMatte 31HD, MicroMatte 1011 UVW from Micro Powders, Inc.

Exemplary rheology control agents include RHEOVIS™ PU1190, RHEOVIS™ PU1331, RHEOVIS™ HS 1332, RHEOVIS™ AS 1330, from BASF; LAPONITE™ RD, RHEOBYK-H™ 6500VF, RHEOBYK-T™ 1000 VF from Byk Chemie; RHEOLATE™ 150, RHEOLATE™ CVS 15 and RHEOLATE™ 1 from Elementis Specialties of Hightstown, NJ; ACRYSOL™ L TT-935, ACRYSOL™ SCT-275, ACRYSOL™ RM-12W, ACRYSOL™ RM-8W, ACRYSOL™ RM-2020 and ACRYSOL™ RM-825 from Dow Chemical Co. of Midland, MI; NATROSOL™ 250HR and NATROSOL™ PLUS 330 from Ashland, Inc. of Covington, KY.

The disclosed coating compositions may include a biocide, fungicide, mildewcide or other preservative. Exemplary such materials include KATHON™ LX microbicide, the BUSAN™ series of bactericides, fungicides and preservatives including BUSAN 1292 and 1440 from Buckman Laboratories of Memphis, TN; the POLYPHASE™ series of bactericides, fungicides and algaecides including POLYPHASE™ 663 and 678 from Troy Chemical Corp. of Florham Park, NJ, the IRGAROL™ and NUOSEPT™ series of biocides including NUOSEPT 91, 101, 145, 166, 495, 497, 498, 515, 635W and 695 from International Specialties Products, the FUNGITROL™ series of fungicides including FUNGITROL C, 334, 404D, 720, 920, 960, 2002, and 2010 from International Specialties Products, the DOWICIL™ series of antimicrobials and preservatives including DOWICIL 75, 96, 150, 200, and QC-20 from Dow Chemical Co., and the microbiostat preservative 1,2-benzisothiazolin-3-one (PROXEL® AQ from Arch Chemicals, Inc.).

The coating composition may also include other adjuvants which modify properties of the coating composition as it is stored, handled, or applied, and at other or subsequent stages. Desirable performance characteristics include chemical resistance, abrasion resistance, hardness, gloss, reflectivity, appearance, or combinations of these characteristics, and other similar characteristics. Many suitable adjuvants are described in Koleske et al., Paint and Coatings Industry, April, 2003, pages 12-86 or will be familiar to those skilled in the art. Representative adjuvants include pH adjusting agents, anti-cratering agents, colorants, curing indicators, dispersants, dyes, flatting agents (e.g., BYK CERAFLOUR™ 920 from Byk Chemie), glycols, heat stabilizers, leveling agents, mar and abrasion additives, optical brighteners, plasticizers, sedimentation inhibitors, thickeners, ultraviolet-light absorbers and the like to modify properties.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods. The following abbreviations may be used in the following examples: ppm=parts per million; mL=milliliter; L=liter; m=meter, mm=millimeter, cm=centimeter, kg=kilogram, g=gram, min=minute, s=second, hrs=hour, ° C.=degrees Celsius, ° F.=degrees Fahrenheit, MPa=megapascals, and N-m=Newton-meter, Mn=number average molecular weight, cP=centipoise, g/mol=gram per mole, psi=pounds per square inch, mJ/mil+megajoules per thousandth of an inch.

Unless otherwise indicated, the following test methods were used in the following examples.

Gloss

This test was performed consistent with ASTM D523 to assess the gloss of the coating. Gloss, as described in these examples, is equivalently referred to as "85° sheen."

Wet Burnish Resistance

This test is performed to assess the percentage sheen change of sample coatings in response to polishing or rubbing by a melamine sponge while the sponge is wet (with water). Cured coating samples are formed by performing 7-mil drawdowns of sample paint on Leneta scrub panels (black P-121-10-N). Paint is allowed to dry/cure for seven days at ambient temperature. 85° sheen is measured for each sample, and then a melamine sponge, saturated with water, is mounted on a washability/abrasion tester. Each sample is run for 50 cycles with the sponge rubbing the sample. After test completion, the coating sample is removed and rinsed under running, lukewarm water. The panel is allowed to dry vertically for a minimum of 2 hours before taking measurements. The final 85° sheen is measured. Percent change in sheen between the first and second measurements is calculated. Lower % change in sheen indicates better wet burnish resistance.

Rubber Mar Resistance

Rubber mar resistance testing was performed to assess the mar resistance of the coating to being impacted with pieces of rubber. Rubber mar resistance is measured on a 3-mil thick wet coating cured on panels for 7 days at 77° F. and 50 percent relative humidity. The cured painted panels were placed and secured inside an empty container, which is then placed on a paint shaker, and repeatedly impacted with pieces of rubber by running the paint shaker for the same amount of time for all samples such that the samples impact the pieces of rubber. The resultant surface was examined visually (rating 1-10 where 1 is the worst and 10 is then best) and also with an image software sub-routine, which measured the area darkened by the rubber. Results are reported herein as the percentage area darkened (measured by the image software sub-routine). A set of example panels are used for comparison during visual rating. A higher % marked area indicates poorer performance.

The present disclosure is further described in the following examples that are intended as illustrations only. It is to be understood that the particular examples, materials, amounts, and procedures are to be interpreted broadly in accordance with the scope and spirit of the present inventions as set forth herein.

Unless otherwise noted, all parts, percentages, and ratios reported in the following examples are on a weight basis. Unless otherwise specified, all chemicals are used are commercially available.

Example 1: Preparation of Modified Pigment/Extenders

Dry, Milling Process

Modified pigment or extenders were prepared by adding 1.5 wt-% of a functional linkage to the base pigment or extender, milling the mixture of the base pigment or extender with the functional linkage for about 2 hours, and then baking the milled mixture at 80° C. for about 1 hour. The modified pigments or extenders were then dispersed into paint by a high-speed grinding process (dispersing blade, not media-based dispersion, for example, 15 minutes at 2000 rpm and 77° F. (25° C.)).

Minex® 4 Nepheline Syenite was modified using the foregoing dry process with various aminosilane functional linkages, including a primary amine (3-Aminopropyltriethoxysilane; DYNSALYN® AMEO ("AMEO")), secondary amine (DYNSALYN® 1189—a bifunctional silane possessing a reactive secondary amine and hydrolyzable methoxysilyl group ("1189")), and a tertiary amine (DYNSYLAN® TRIAM—organofunctional silane possessing three reactive amino groups and a hydrolysable trimethoxysilyl group ("TRIAMO")). The Minex® 4 Nepheline Syenite was also modified with a DAAM-silane functional linkage.

Other base pigments and extenders were also modified using the foregoing dry process with the primary amine AMEO, including $TiO_2$, CERETAN® MPS 3120—silica coated micronized polypropylene wax, glass bubbles (3M), kaolin (ASP® 400—BASF), mica (MICA 325 mesh) and talc (TALCRON® MP45-26 Talc).

Wet Process

Modified pigment or extenders were also prepared by adding 1.5 wt-% of an aqueous functional linkage to a dispersion of the base pigment or extender during the grinding process. Each aqueous functional linkage was added to the dispersion of the base pigment or extender during the grinding process in a slow manner so as to prevent gelling/skinning. The grinding of the base pigment or extender dispersion with the aqueous functional linkage occurred under ambient laboratory conditions of an extender in the architectural paint grinding process (2000 rpm for 15 minutes with dispersing blade at 77° F. (25° C.)). Minex® 4 Nepheline Syenite was modified using the foregoing aqueous process with various aminosilanol functional linkages, including aqueous 3-aminopropylsilane hydrolysate (DYNSYLAN® HYDROSIL 1151) and aqueous multiple-amine silane hydrolysate (DYNSYLAN® HYDROSIL 2775).

Example 2: Latex Polymer Compositions

The latex polymers used in the following examples each met the following conditions with respect to the monomers from which they were derived:

| Monomer Component | Amount by Wt. % of all Monomers in Polymer |
|---|---|
| Methyl methacrylate | 30-40% |
| Styrene | 0-20% |
| 2-Ethylhexyl acrylate | 35-45% |
| 2-(Acetoacetoxy)ethyl methacrylate OR Diacetone Acrylamide | 2-12% |
| Methacrylic Acid | 1-4% |

Example 3: Preparation of Coating Compositions

Coating compositions containing the modified pigments or extenders prepared in Example 1 were prepared by adding the modified pigment or extender in various amounts to model white flat waterborne coating formulations (85° sheen<5) with a constant PVC of 50. Latex polymers satisfying the monomer constraints provided in Example 2 were formulated into the model white flat waterborne coating (85° sheen<5) with a constant PVC of 50. These latex polymers include Latex #1 (MFFT=12° C.) as a negative Control (no pendant reactive functional groups), all acrylic, AAEM-functional Latex #2 (MFFT=2° C.), styrene/acrylic, DAAM-functional Latex #'s 3 (MFFT=36° C.) and 4 (MFFT=2° C.), high MFFT, styrene acrylic, AAEM-functional Latex #5 (MFFT=56° C.; 5% AAEM by weight of total binder polymer monomer mix), and all acrylic, AAEM-functional Latex #6 (MFFT=9° C.). Control coating compositions containing unmodified pigments or extenders for controls were also prepared by adding base pigment or extender to coating formulations that otherwise matched the above compositions described in this Example 3.

Example 4: Comparison of Minex® 4 Nepheline Syenites

Wet burnish resistance testing was performed on the coating compositions prepared as described in Example 3 containing both unmodified Minex® 4 Nepheline Syenite (Controls) and modified Minex® 4 Nepheline Syenite. For each of the coating compositions containing modified Minex® 4 Nepheline Syenite, the Minex® 4 Nepheline Syenite was modified using the dry, milling process with the primary amine AMEO as the functional linkage, except the coating compositions using Latex #'s 4 and 5, where the Minex® 4 Nepheline Syenite was modified using the dry process with a DAAMV-silane functional linkage. The test data is reported in Table 1.

TABLE 1

Wet Burnish Resistance and Rubber Mar-Unmodified v. Modified Minex® 4

| Binder Polymer | Pigment/ Extender | Wet Burnish (% Sheen Change) | Rubber Mar (% Marked Area) |
|---|---|---|---|
| Latex #1 (control) | Minex4 | 60.8 | 2.69 |
| Latex #1 | Ameo-Minex4 | 53.8 | 2.30 |
| Latex #2 (control) | Minex4 | 122.8 | 2.95 |
| Latex #2 | Ameo-Minex4 | 67.7 | 3.87 |
| Latex #'s 3 and 4 (control) | Minex4 | 70.0 | 2.19 |
| Latex #'s 3 and 4 | DAAM-Minex4 | 58.8 | 1.50 |

TABLE 1-continued

Wet Burnish Resistance and Rubber Mar-Unmodified v. Modified Minex® 4

| Binder Polymer | Pigment/ Extender | Wet Burnish (% Sheen Change) | Rubber Mar (% Marked Area) |
|---|---|---|---|
| Latex #5 (control) | Minex4 | 55.2 | 0.68 |
| Latex #5 | Ameo-Minex4 | 39.2 | 0.56 |
| Latex #6 (control) | Minex4 | 77.8 | NA |
| Latex #6 | Ameo-Minex4 | 54.8 | NA |

The coating compositions containing Latex #1, Latex #2 and Latex #'s 3 and 4 as the polymer binder were also tested for tensile strain at break, tensile strength, modulus and toughness/film thickness using ASTM D2370-16 ("Standard Test Method for Tensile Properties of Organic Coatings"). A 0.5-inch by 3-inch specimen shape was used. Grip separation was 1.0" and the cross-head speed was set at 1.0"/min. Ten specimens were run for each composition and the five with the highest tensile strength were selected for the average, reported value. The test data is reported in Table 2. Improvements are seen in % Elongation and Energy at Break.

TABLE 2

Coating Mechanical Property Analysis.

| Binder Polymer | Extender | Tensile Strain at Break (% Elongation) | Tensile Strength (psi) | Modulus (psi) | Energy at Break (Toughness/ Film Thickness- mJ/mil) |
|---|---|---|---|---|---|
| Latex #1 (Control) | Minex4 | 64.1 | 305.6 | 2088.1 | 9.408 |
| Latex #1 | Ameo-Minex4 | 77.5 | 348.1 | 1954.9 | 12.945 |
| Latex #2 (Control) | Minex4 | 25.5 | 444.2 | 6659.7 | 5.510 |
| Latex #2 | Ameo-Minex4 | 48.7 | 359.6 | 2693 | 8.574 |
| Latex #'s 3 and 4 (Control) | Minex4 | 10.8 | 650.7 | 14505.1 | 3.036 |
| Latex #'s 3 and 4 | DAAM-Minex4 | 11.7 | 692.9 | 14576.8 | 3.448 |

Example 5: Comparison of Various Aminosilane Functional Linkages

Wet burnish resistance testing was also performed on the coating compositions prepared in Example 3 as identified below in Table 3 that were prepared using the unmodified (Control) or modified Minex® 4 Nepheline Syenites. For Example 5, the modified Minex® 4 Nepheline Syenites were modified by the dry process discussed in Example 1 with the following aminosilane functional linkages: (i) primary amine (AMEO), (ii) secondary amine (1189). The test data is reported in Table 3.

TABLE 3

Wet Burnish Resistance-Various Aminosilane-Modified Minex® 4

| Binder Polymer | Pigment/ Extender | Wet Burnish (% Sheen Change) | Rubber Mar (% Marked Area) |
|---|---|---|---|
| Latex #1 (Control) | Minex4 | 60.8 | 2.69 |
| Latex #1 | AMEO-Minex4 | 53.8 | 2.30 |
| Latex #1 | 1189-Minex4 | 64.4 | 2.13 |
| Latex #6 (Control) | Minex4 | 77.8 | NA |
| Latex #6 | AMEO-Minex4 | 54.8 | NA |
| Latex #6 | 1189-Minex4 | 57.1 | NA |
| Latex #5 (Control) | Minex4 | 55.2 | 0.68 |
| Latex #5 | AMEO-Minex4 | 39.2 | 0.56 |
| Latex #5 | 1189-Minex4 | 41.1 | 0.45 |

Example 6: Comparison of Various Aminosilane Modified Pigments/Extenders

Wet burnish resistance testing was performed on various coating compositions prepared in Example 3 with the coating compositions prepared using Latex #5 as the binder polymer and various modified and unmodified pigments. Coatings compositions tested each include one of the following pigments/extenders (functionalized pigments were modified with the primary amine aminosilane (AMEO) using the dry mill method of preparation of Example 1), provided below in Table 4: $TiO_2$, CERETAN® MPS 3120—(silica coated micronized polypropylene wax, available from Munzig Chemie Gmbh), CERETAN® MXS3815—(silica coated blend wax, available from Munzig Chemie Gmbh), 3M glass bubbles, Kaolin, 325 Mica, or TALCRON® MP45-26 talc (available from the Cary Company).

TABLE 4

Wet Burnish Resistance-Different Modified Pigments/Extenders

| Binder Polymer | Pigment/ Extender | Wet Burnish (% Sheen Change) | Rubber Mar (% Marked Area) |
|---|---|---|---|
| Latex #5 (Control) | $TiO_2$ | 55.2 | 0.68 |
| Latex #5 | AMEO-$TiO_2$ | 36.4 | 0.95 |
| Latex #5 (Control) | MXS3815 | 74.1 | 1.17 |
| Latex #5 | AMEO-MXS3815 | 63.8 | 0.97 |
| Latex #5 (Control) | MSP3120 | 67.9 | 1.09 |
| Latex #5 | AMEO-MSP3120 | 62.1 | 1.08 |
| Latex #5 (Control) | Glass Bubbles | 63.9 | 1.16 |
| Latex #5 | AMEO-Glass Bubbles | 60.6 | 1.02 |
| Latex #5 (Control) | Kaolin | 120.5 | 1.33 |
| Latex #5 | AMEO-Kaolin | 131.2 | 1.26 |
| Latex #5 (Control) | 325 Mica | 102.5 | 1.43 |
| Latex #5 | AMEO-325 Mica | 102.4 | 0.84 |
| Latex #5 (Control) | MP45-26 Talc | 77.3 | 0.95 |
| Latex #5 | AMEO-MP45-26 Talc | 86.2 | 1.11 |

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A one-component waterborne coating composition comprising: a stable aqueous dispersion of a mixture of a reactive binder polymer, a plurality of functionalized pigment particles, and a crosslinker; wherein the reactive binder polymer is derived from at least one monomer having at least one reactive functional group; wherein each functionalized pigment particle comprises a base pigment having one or more functional linkages, each functional linkage capable of binding to one or more reactive functional groups on the reactive binder polymer to bond the functionalized pigment particle to the binder polymer either directly by a bond between functional linkage and reactive functional group or via the crosslinker: wherein the functional linkage is an aminosilane with a siloxy group of the aminosilane capable of bonding with the base pigment, and an amino group of the aminosilane capable of bonding with one of the at least one reactive functional groups of the binder polymer; and wherein: (a) the crosslinker is selected from the group consisting of a diamine, a triamine, a polymeric amine, and mixtures thereof; and (b) a molar ratio of reactive functional group to total amine, wherein total amine is defined as the combined molar amounts of the crosslinker and the aminosilane functional linkage in the coating composition, is in the range of about 0.3:1 to about 2:1; and (c) a molar ratio of the crosslinker to the aminosilane in the coating composition is in the range of about 1.5:1 to about 5:1.

2. The one-component waterborne coating composition of claim 1, wherein the waterborne coating composition is capable of curing under an ambient temperature.

3. The one-component waterborne coating composition of claim 1, wherein the base pigment is selected from the group consisting of nepheline syenite, aluminum hydroxide, alumina cristobalite, fumed silica, kaolin, precipitated silica, quartz, wollastonite, glass spheres, glass bubbles, magnesium hydroxide, mica, talc, titanium dioxide, iron oxide, polymer-pigment composite particles, wax-pigment composites, and mixtures thereof.

4. The one-component, ambient cure, waterborne coating composition of claim 3, wherein the base pigment is nepheline syenite.

5. The one-component waterborne coating composition of claim 1, wherein the crosslinker is capable of reacting with the reactive functional group of the binder polymer and the functional linkage of the functionalized pigment.

6. The one-component waterborne coating composition of claim 1, wherein the crosslinker is a compound having two or more amine moieties, the reactive functional group is an acetoacetoxyethyl (meth)acrylate group, and the functional linkage comprises an amine functional group.

7. The one-component waterborne coating composition of claim 1, wherein the reactive functional group is selected from the group consisting of acetoacetoxyethyl methacrylate, diacetone acrylamide, and mixtures thereof.

8. The one-component waterborne coating composition of claim 1, wherein the monomer having at least one reactive functional group is present in the binder polymer in an amount ranging from about 1 wt-% to about 12 wt-% of the total weight of the binder polymer monomer mix.

9. The one-component waterborne coating composition of claim 1, further comprising at least one additional pigment selected from talc, clay, silicates, aluminum silicates, calcium metasilicates, aluminum potassium silicates, magnesium silicates, barium sulfates, nepheline syenite, feldspar, zinc oxides, titanium dioxide, and mixtures thereof.

10. The one-component waterborne coating composition of claim 9, wherein the at least one additional pigment is present in an amount of at least about 10 wt-% of the total weight of the coating composition.

11. The one-component waterborne coating composition of claim 1, wherein the functional linkage is an aminosilane present in the functionalized pigment in an amount ranging from about 1.0 wt-% to about 4.0 wt-% of the total weight of the functionalized pigment.

12. The one-component waterborne coating composition of claim 1, wherein the aminosilane coupling agent is present in the functionalized pigment such that the surface of each base pigment particle is saturated with the aminosilane coupling agent.

13. The one-component waterborne coating composition of claim 1, wherein the coating composition has a volatile organic content of less than 50 g/L.

* * * * *